US008010040B2

(12) United States Patent
Dale et al.

(10) Patent No.: US 8,010,040 B2
(45) Date of Patent: Aug. 30, 2011

(54) QUEUE DEPTH EXTENDED HEADERS FOR DOCSIS BASED BROADBAND COMMUNICATION SYSTEMS

(75) Inventors: Mark Dale, Laguna Hills, CA (US); Dorothy D Lin, Laguna Beach, CA (US); Alan Gin, Corona Del Mar, CA (US); Jen-Chieh Chien, Lake Forest, CA (US); David Hartman, Laguna Hills, CA (US); Rocco J Brescia, Jr., Newport Coast, CA (US); Ravi C Bhaskaran, Irvine, CA (US); Adel F Fanous, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 302 days.

(21) Appl. No.: 10/420,905

(22) Filed: Apr. 23, 2003
(Under 37 CFR 1.47)

(65) Prior Publication Data

US 2004/0162020 A1    Aug. 19, 2004

Related U.S. Application Data

(60) Provisional application No. 60/374,523, filed on Apr. 23, 2002.

(51) Int. Cl.
*H04H 20/74* (2008.01)
(52) U.S. Cl. ........ 455/3.02; 370/253; 370/349; 370/471
(58) Field of Classification Search .................. 455/3.02, 455/12.1, 13.1, 427, 11.1; 370/316, 229, 370/232, 235, 252, 253, 349, 389, 392, 471, 370/474
See application file for complete search history.

(56) References Cited

U.S. PATENT DOCUMENTS

| | | | | |
|---|---|---|---|---|
| 6,169,728 B1 * | 1/2001 | Perreault et al. | ............... | 370/235 |
| 6,628,641 B1 * | 9/2003 | Strawczynski et al. | ........ | 370/349 |
| 6,807,193 B1 * | 10/2004 | Beser | ............. | 370/498 |
| 6,845,100 B1 * | 1/2005 | Rinne | ................. | 370/395.43 |
| 2002/0009051 A1 | 1/2002 | Cloonan | .............. | 370/232 |
| 2002/0021711 A1 | 2/2002 | Gummalla et al. | ......... | 370/464 |
| 2003/0058794 A1 * | 3/2003 | Pantelias et al. | ............. | 370/230 |
| 2003/0069926 A1 * | 4/2003 | Weaver et al. | ............... | 709/203 |
| 2003/0147411 A1 | 8/2003 | Goosman | ............. | 370/412 |

OTHER PUBLICATIONS

Cable Television Laboratories, Inc., "Data-Over-Cable Service Interface Specifications Radio Frequency Interface Specification", SP-RFIv1.1-I09-020830, 1999-2002, pp. 1-444, Website: http://www.cablemodem.com/downloads/specs/SP-RFIv1.1-I09-020830.pdf.
International Search Report issued Nov. 14, 2003 for Appln. No. PCT/US03/12645, 6 pages.

* cited by examiner

*Primary Examiner* — Dominic E Rego
(74) *Attorney, Agent, or Firm* — Sterne, Kessler, Goldstein & Fox P.L.L.C.

(57) ABSTRACT

A system and method for requesting additional bandwidth in a communications channel between one or more first satellite terminal devices and a second satellite terminal device, are provided. The method includes identifying an available field in a header to be transmitted from the one or more first devices to the second device and allocating at least a portion of the available field for requesting the additional bandwidth. A size of the available field is reconfigurable. The method also includes forwarding the extend header to the second device.

26 Claims, 8 Drawing Sheets

FIG. 4
(Conventional)

| EH_TYPE | EH_LEN | EH_VALUE |
|---|---|---|
| 0 | 0 | Null configuration setting; may be used to pad the extended header. The EH_LEN MUST be zero, but the configuration setting may be repeated. |
| 1 | 3 | Request: mini-slots requested (1 byte); SID (2 bytes) [CM → CMTS] |
| 2 | 2 | Acknowledge requested ; SID (2 bytes) [CM → CMTS] |
| 3 (= BP_UP) | 4 | Upstream Privacy EH Element |
| | 5 | Upstream Privacy with Fragmentation EH Element |
| 4 (= BP_DOWN) | 4 | Downstream Privacy EH Element |
| 5 | 1 | Service Flow EH Element; Payload Header Suppression Header Downstream |
| 6 | 1 | Service Flow EH Element; Payload Header Suppression Header Upstream |
| | 2 | Service Flow EH Element; Payload Header Suppression Header Upstream (1 byte), Unsolicited Grant Synchronization Head (1 → byte) |
| 7 – 9 | | Reserved |
| 10 – 14 | | Reserved [CM ↔ CM] |
| 15 | XX | Extended EH Element; EHX_TYPE (1 byte), EHX_LEN (1 byte), EH_Value (length determined by EHX_LEN) |

(Conventional)

| EH_TYPE | EH_LEN | EH_VALUE |
|---------|--------|----------|
| 0 - 8 | Per FIG. 5 | Per FIG. 5 |
| 9 | 3-5 | Queue Depth |
| 10 - 15 | Per FIG. 5 | Per FIG. 5 |
| 4 bits | 4 bits | 3-5 bytes |
| 4-6 bytes | | |

FIG. 6

| EH Element Fields | Usage | Size |
|---|---|---|
| EH_TYPE | Service Flow EH_TYPE=9 | 4 bits |
| EH_LEN | Length of EH_VALUE = 3, 4, or 5 | 4 bits |
| EH_VALUE | Service Flow Identifier (SID) | 2 bytes |
| | (Queue Depth) The number of bytes waiting to be transmitted on this Service Flow | 1, 2, or 3 bytes |

QUEUE DEPTH EXTENDED HEADERS FOR DOCSIS BASED BROADBAND COMMUNICATION SYSTEMS

CROSS REFERENCE TO RELATED APPLICATIONS

The present application claims the benefit of U.S. Provisional Patent Application No. 60/374,523, filed on Apr. 23, 2002, entitled "Queue Depth Extended Headers for DOCSIS Based Broadband Communication Systems," which is incorporated herein by reference.

BACKGROUND OF THE INVENTION

1. Field of the Invention

The present invention relates to broadband communication systems that use Data Over Cable Service Interface Specification (DOCSIS) media access protocol or any of its derivatives. Particularly, the present invention applies to two way satellite services that use the upstream channel descriptor of DOCSIS specification to characterize the upstream channel.

2. Background Art

Functional cable systems require high-speed packet based communication systems that are capable of supporting a wide variety of services. Services under consideration include packet telephony service, video conferencing service, T1/frame relay equivalent service and many others. In support of facilitating these services, a series of DOCSIS interface specifications have been developed. The DOCSIS specifications facilitate early definition, design, development and deployment of data-over-cable systems on a uniform, consistent, open, non-proprietary, multi-vendor interoperable basis. The intended service allows transparent bi-directional transfer Internet Protocol (IP) traffic through the data-over-cable system.

Traditional DOCSIS based satellite broadband communication systems, that allow deploying high-speed packet based communication, lack adequate specifications that allow their definition and design in a uniform manner.

In DOCSIS based broadband data communication architectures, data is transferred between a central location and many remote subscribers. The centrally located equipment can include, for example, a Headend (cable system), wireless access termination system (WATS—broadband terrestrial fixed wireless), or a satellite gateway (SMTS—satellite modem termination system).

Subscriber equipment typically includes a cable modem (CM—cable system), wireless modem (WM—broadband terrestrial fixed wireless) or a satellite modem (SM—two-way satellite).

The communication path from the gateway to the satellite modem is known as the downstream channel. Conversely, the communication path from the satellite modem to the gateway is known as the upstream channel. In standard DOCSIS based systems, traffic for the satellite modem is typically placed in time domain multiplex (TDM) fashion on the downstream channel. The satellite modem also shares upstream channels in the time domain multiplex (TDM) fashion. If the satellite modem is using a particular downstream channel, then its upstream channel traffic is assigned to one of typically several upstream channels that are associated with each downstream channel. The combination of a downstream channel and its corresponding upstream channels forms the media access control (MAC) domain of the satellite system.

In standard DOCSIS based systems, the satellite modem sends information to the gateway on the upstream channel at burst times. The burst's timing is controlled by the gateway. The information transmitted can include either data or MAC management information or both. When the Satellite modem is sending data, the transmitted data packets, or protocol data units (PDUs), are encapsulated into DOCSIS frames for the purpose of transmission. The encapsulation includes prepending a MAC header to the PDU.

In order to allow different satellite modems to share upstream channels the gateway sends bandwidth grant allocation messages, also known as media access protocol messages (MAP) to the satellite modems for each upstream in the MAC domain of the downstream. The MAP messages identify burst types and set times for each satellite modem that is granted bandwidth on a given upstream channel. The MAP messages also identify time intervals for initial ranging for satellite modems that wish to attempt to register for the first time on a channel.

The format of a DOCSIS header, associated with the MAC domain, is known from DOCSIS protocol standards. The header consists of minimum 6 bytes and includes a variable length extended header (EHDR). An EDHR field is commonly used to make "piggyback" bandwidth requests. Per DOCSIS convention, the bandwidth requests are always made in units of "mini-slots." A mini-slot is a fixed amount of time known by both Satellite modem and gateway. The length of a mini-slot is dependent upon upstream channel parameters and is constrained to always be an integer power-of-2 factor of the upstream channel period.

Also in DOCSIS based systems, a concatenated coding scheme is used in the upstream. The concatenated code includes a DOCSIS based Reed Solomon outer code together with an inner convolutional or Turbocode. The sizes of mini-slots are typically configured such that a mini-slot contains a fairly small integer number of bytes of the Reed-Solomon outer code data (e.g., 8 bytes).

When using the piggyback extended header, the EHDR field can be used to request a maximum of 255 additional mini-slots per upstream PDU. The 255 mini-slot limitation cannot be enlarged in standard DOCSIS based applications because the piggyback request field is limited to one byte (per DOCSIS standard). For example, if each mini-slot contains 8 bytes of outer code information, the satellite modem could make a request for a maximum of 8×255=2040 bytes. The largest Ethernet frame is 1518 bytes. With reasonable definitions for Reed-Solomon codeword size, 2040 bytes of outer code data is adequate to be requested within the largest Ethernet frame.

The long delays involved in satellite applications make it highly desirable to use the piggyback method of requesting bandwidth rather than the contention based request mechanism. The limitation of the standard DOCSIS piggyback method becomes apparent when a large amount of upstream data is to be transmitted by the Satellite modem. In this case, if the Satellite modems were limited by the standard DOCSIS piggyback approach, a maximum of 255 mini-slots could be requested with each upstream PDU transmitted.

If the satellite modem is transmitting 1518 byte PDUs, it must wait for the packet to propagate from the Satellite modem to the gateway (approximately 0.25 seconds for geostationary satellites) and for the next grant to arrive from gateway (another 0.25 seconds). Since the round trip time is 0.5 seconds, a maximum of approximately 2 packets per second could be transferred, yielding a maximum data rate of about 3 kbytes per second. This data rate is far too small to be useful in current broadband satellite applications.

What is needed, therefore, is a mechanism to allow the satellite modem to request additional bandwidth from the gateway in order to facilitate higher communication data rates. What is also needed is definition, design, and development of data-over-cable satellite systems on a uniform and consistent basis.

BRIEF SUMMARY OF THE INVENTION

Consistent with the principles of the present invention as embodied and broadly described herein, an embodiment of the present invention includes a method for requesting additional bandwidth in a communications channel between one or more first satellite terminal devices and a second satellite terminal device. The method includes identifying an available field in a header to be transmitted from the one or more first devices to the second device and allocating at least a portion of the available field for requesting the additional bandwidth.

A size of the available field is reconfigurable. The method also includes forwarding the extend header to the second device.

Further features and advantages of the present invention, as well as the structure and operation of various embodiments of the present invention, are described in detail below with reference to the accompanying drawings.

BRIEF DESCRIPTION OF THE FIGURES

The accompanying drawings which are incorporated therein and form a part of the specification illustrate the present invention and together with the description further serve to explain the principles of the invention and to enable a person skilled in the present art to make and use the invention.

DETAILED DESCRIPTION OF THE INVENTION

The following detailed description of the accompanying drawings illustrates exemplary embodiments consistent with the present invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware and/ or the entities illustrated in the figures. Any actual software code with the specialized control hardware to implement the present invention, is not limiting of the present invention. Thus, the operation and behavior of the present invention will be described with the understanding that modifications and variations of the embodiments are possible, given the level of detail presented herein.

Figure 1:
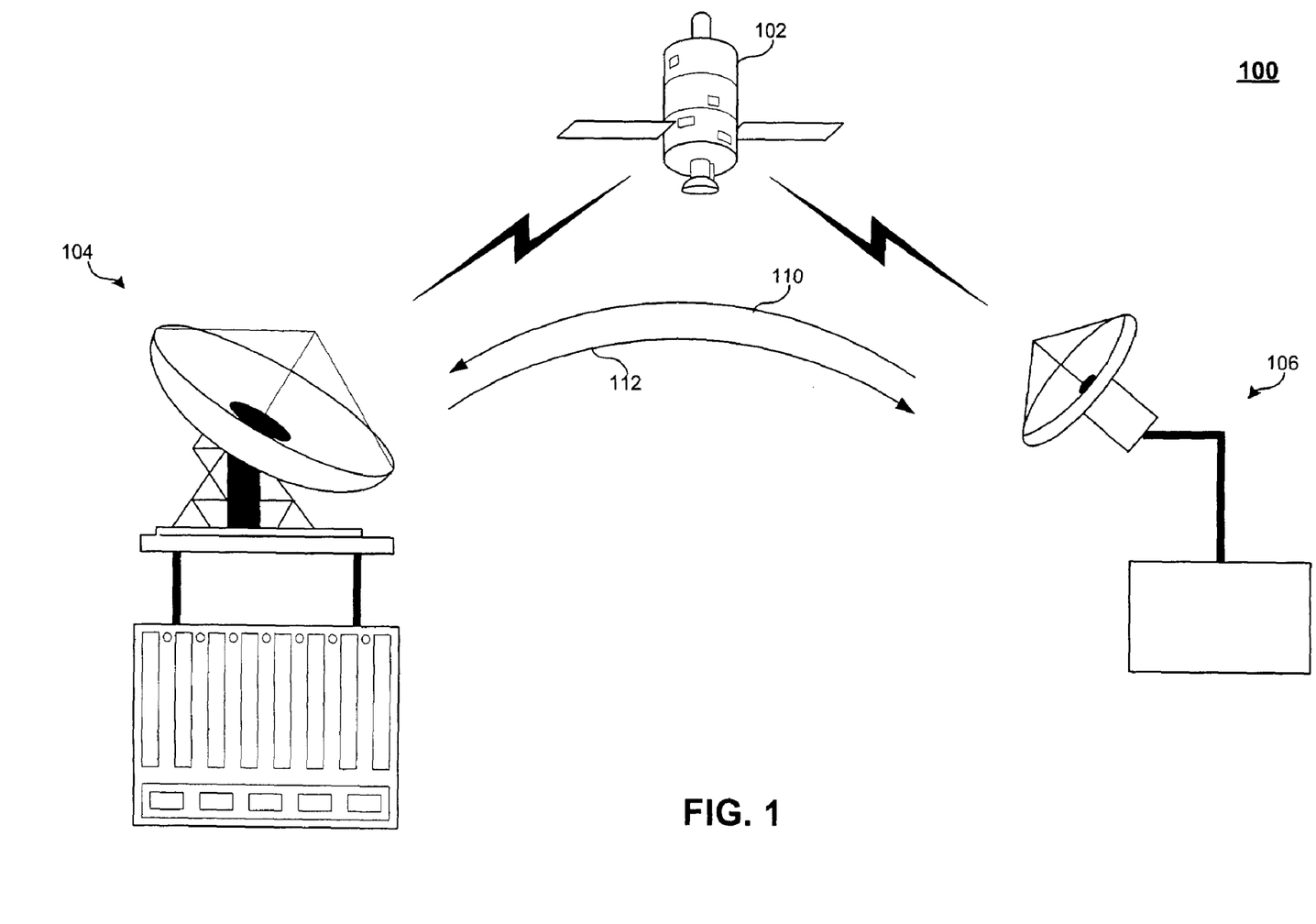
FIG. 1 is an illustration of basic elements of a two way satellite communication system constructed and arranged in accordance with an embodiment of the present invention.

FIG. 1 illustrates the basic elements of a conventional satellite Internet communication system 100. In FIG. 1, the satellite communication system 100 includes a satellite 102, a gateway 104, and a satellite modem console 106. An upstream channel 110 is established from the satellite modem console 106 to the gateway 104. A downstream channel 112 is established from the gateway 104 to the satellite modem console 106.

Figure 2:
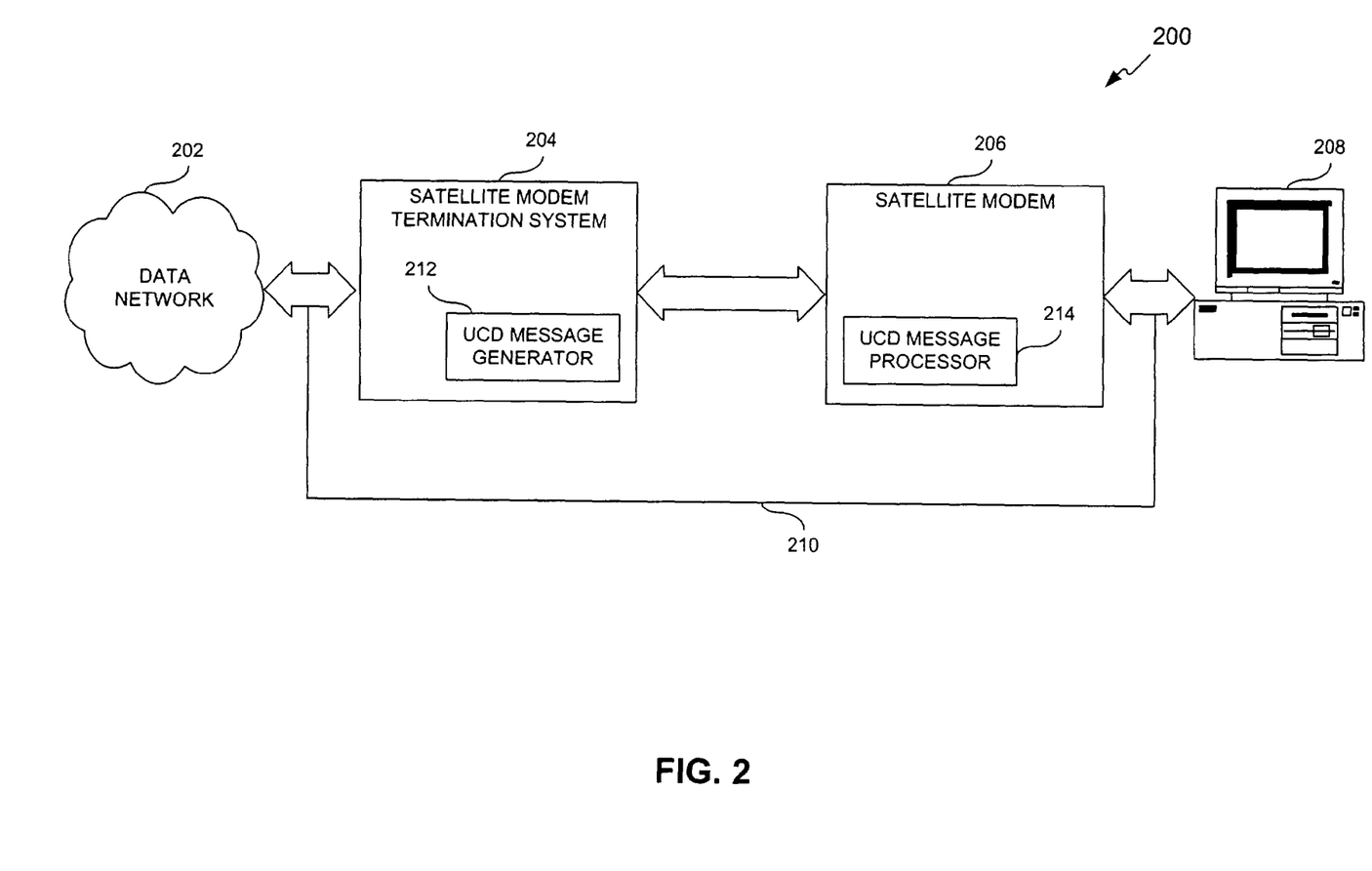
FIG. 2 is a high level block diagram illustration of a two-way satellite communications system in which embodiments of the present invention may operate.

FIG. 2 is a high-level depiction of a two-way satellite communications system 200, based upon concepts of the system 100, in which an embodiment of the present invention may operate. The communications system 200 provides a more detailed view of an embodiment of the satellite modem console 106 of FIG. 1. As shown in FIG. 2, the two-way satellite communications system 200 includes a satellite modem termination system (SMTS) 204 and at least one satellite modem 206.

The two-way satellite communications system 200 utilizes satellites (not shown) to facilitate the transparent bi-directional transfer of data 210, including but not limited to IP traffic, between the SMTS 204 and the satellite modem 206. To this end, the SMTS 204 and the satellite modem 206 are each coupled to a transceiver, or transmitter/receiver pair, and antenna (also not shown) for satellite communication purposes. Communication directed from the SMTS 204 to the satellite modem 206 will be referred to herein as downstream communication, while communications directed from the satellite model 206 to the SMTS 204 will be referred to herein as upstream communication. The SMTS 204 could be a mechanism to add network 202, where the added network 202 is a satellite communications network.

The SMTS 204 comprises part of a satellite gateway and operates, in part, to manage the upstream and downstream transfer of data between the satellite gateway and a plurality of satellite modems, such as satellite modem 206, each of which is located at a customer premises. The SMTS 204 broadcasts information downstream to the satellite modems as a continuous transmitted signal in accordance with a TDM technique. Additionally, the SMTS 204 controls the upstream transmission of data from the satellite modems to itself by assigning to each satellite modem short grants of time within which to transfer data. In accordance with this technique, each satellite modem may only send information upstream as short burst signals during a transmission opportunity allocated to it by the SMTS 204.

As shown in FIG. 2, the SMTS 204 further serves as an interface between the two-way satellite communications system 200 and a data network 202, which may comprise a wide area network (WAN) such as the Internet. Interface functions performed by the SMTS 204 include the transfer of data packets received from satellite modems, such as the satellite modem 206, to the data network 202, and conversely, the transfer of data packets received from data network 202 to one or more satellite modems.

The satellite modem 206 operates as an interface between the two-way satellite communications system 200 and at least one CPE 208. In particular, the satellite modem 206 performs the functions necessary to convert downstream signals received via the two-way satellite communications systems 200 into data packets suitable for receipt by the CPE 208. Additionally, the satellite modem 206 performs the functions necessary to convert data packets received from the CPE 208 into upstream burst signals suitable for transfer over the two-way satellite communications system 200.

The satellite modem 206 is shown supporting only a single CPE 208 for clarity. In general, however, the satellite modem 206 is capable of supporting a plurality of CPEs for communication via the two-way satellite communications system 200. Such CPE may include personal computers, data terminal equipment, telephony devices, broadband media players, network-controlled appliances, or any other device capable of transmitting or receiving data over a packet-switched network.

In the two-way satellite communications system 200, the SMTS 204 and the satellite modem 206 comprise DOCSIS-compatible equipment. In other words, the SMTS 204 and the satellite modem 206 are interoperable with other SMTSs and satellite modems that adhere to the protocols set forth in the DOCSIS radio frequency specification (RFI) specification published by Cable Labs. The DOCSIS RFI specification is publicly available on the cable Labs web site (www.cablemodem.com) and is updated from time to time. The current relevant version of the DOCSIS RFI specification is SP-RFOv1.1-I08-020301, which is incorporated by reference in its entirety herein.

However, in accordance with an embodiment of the present invention, the SMTS 204 and the satellite modem 206 are also configured to send and receive messages that include parameters that are not provided for by the DOCSIS RFI specification. In particular, the SMTS 204 includes an upstream channel descriptor (UCD) message generator 212 that generates UCD messages that have been modified to include parameters not provided for by the DOCSIS RFI specification. These parameters may be used to more adequately describe an upstream channel of the two-way satellite communications system 200, or to enable more efficient communication between the SMTS 204 and the satellite modem 206. The UCD message generator 212 uses these parameters in a manner that ensures that the SMTS 204 will be interoperable with DOCSIS-compliant satellite modems that are not adapted to receive such additional parameters.

In further accordance with an embodiment of the present invention, the satellite modem 206 includes a UCD message processor 214 that is configured to receive modified UCD messages transmitted by the SMTS 204 and to process them in order to extract both necessary standard DOCSIS parameters as well as the additional parameters included by the UCD generator 212. As will be discussed in more detail herein, these parameters are then used by the satellite modem 206 in order to more effectively manage upstream communication over two-way satellite communications system 200.

In an embodiment of the present invention, the UCD message generator 212 comprises a part of the MAC sub-layer of the SMTS 204 and the UCD message processor 214 comprises a part of the MAC sub-layer of the satellite modem 206. As will be appreciated by persons skilled in the relevant art(s) based on the teachings provided herein, both the UCD message generator 212 and the UCD message processor 214 may be implemented in software, hardware, or a combination of software and hardware.

Figure 3:
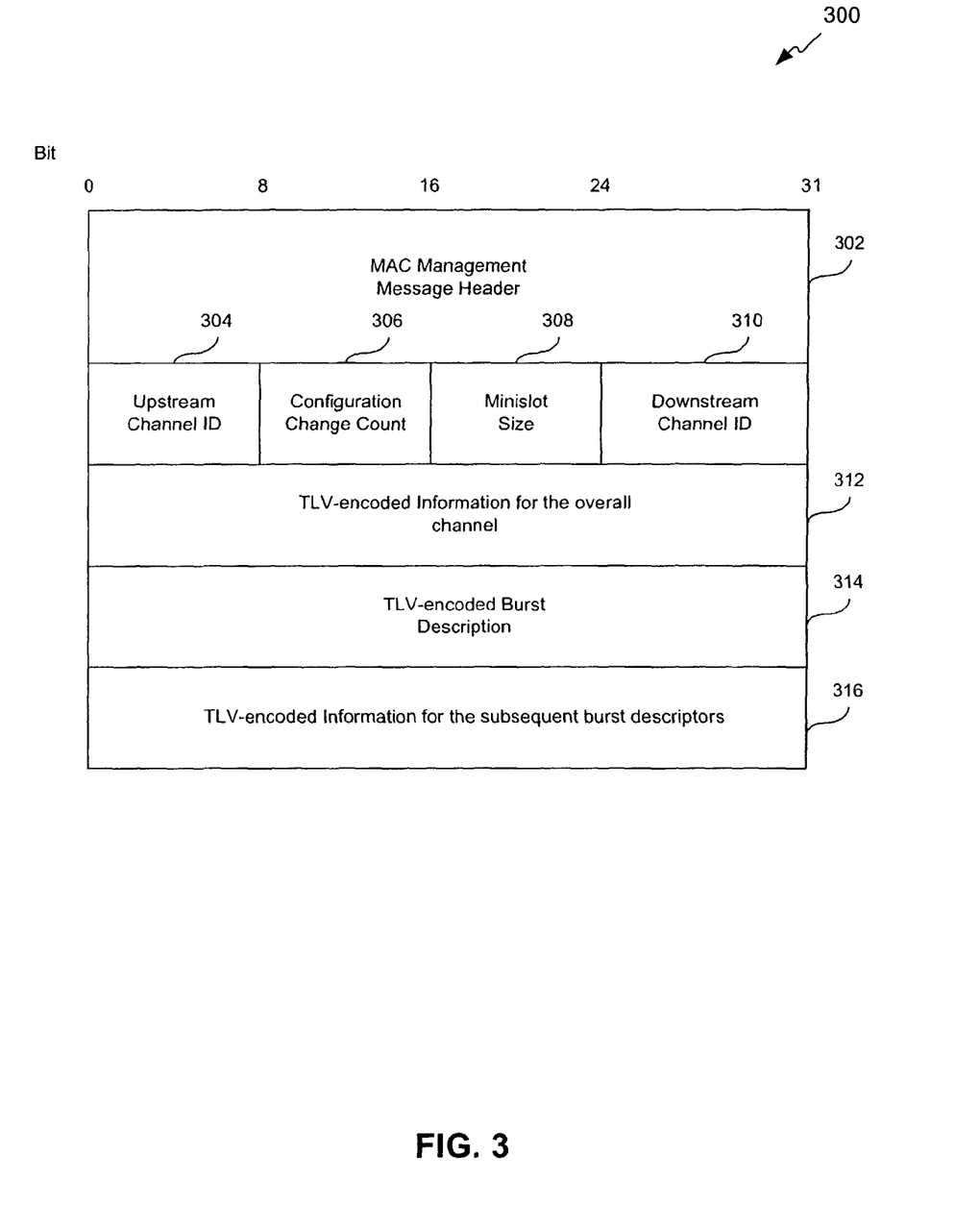
FIG. 3 is an illustration of an exemplary upstream channel descriptor message format.

FIG. 3 is an illustration of a format 300 of a standard DOCSIS UCD message. In accordance with an embodiment of the present invention, the DOCSIS UCD message is transmitted by the SMTS 204 to a plurality of satellite modems, including the satellite modem 206, at a periodic interval to define the characteristics of an upstream channel in the two-way satellite communications system 200. The SMTS 204 transmits a separate UCD message for each active upstream channel.

As shown in FIG. 3, the DOCSIS UCD message includes a plurality of fields, including a MAC management message header 302 prepended to the transmitted data packets, an upstream channel identifier (ID) 304, a configuration change count 306, a mini-slot size 308, a downstream channel ID 310, TLV-encoded information for the overall channel 312, TLV-encoded burst description 314, and TLV-encoded information for the subsequent burst descriptors 316. A description of each of these fields is provided in the DOCSIS RFI specification version SP-RFOv1.1-I08-020301.

As noted above, an embodiment of the present invention is configured to modify an extended header, added to the MAC management message header 302, in order to request additional bandwidth from the SMTS 204 when PDUs are transmitted.

Figure 4:
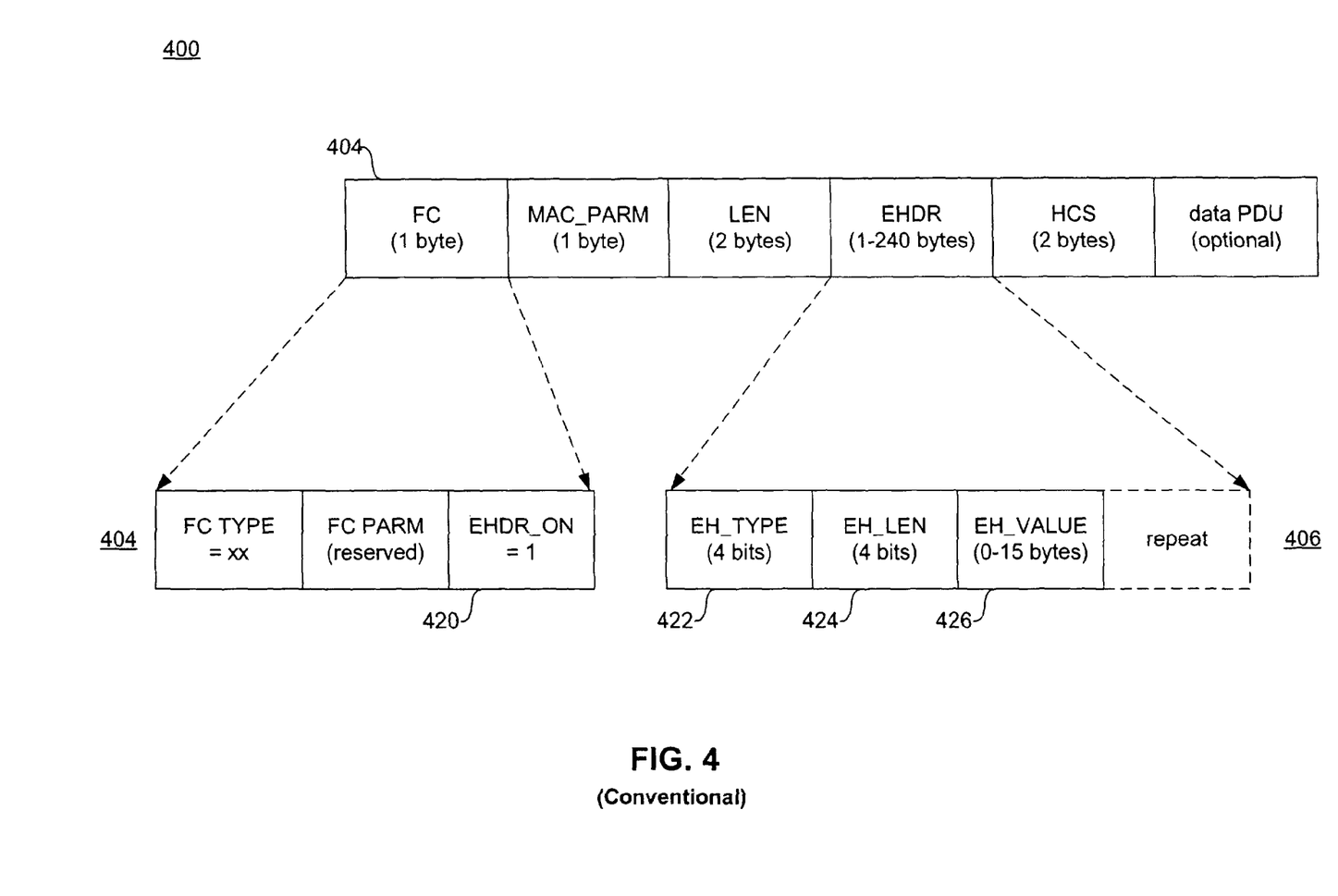
FIG. 4 is an illustration of a conventional DOCSIS specific extended MAC header.

FIG. 4 is an illustration of a conventional DOCSIS specific extended MAC header format 400 with an extended (EHDR) field 406. Every MAC header 400 has the capability of defining an EHDR field. The presence of an EHDR field is indicated by the EHDR_ON flag 420 in a frame control (FC) field 404. When the EHDR_ON flag 420 is set, an EHDR header field 406 is used. The field 406 includes an EH_TYPE field 422, an EH_LEN field 424, and an EH_VALUE field 426.

Figure 5:
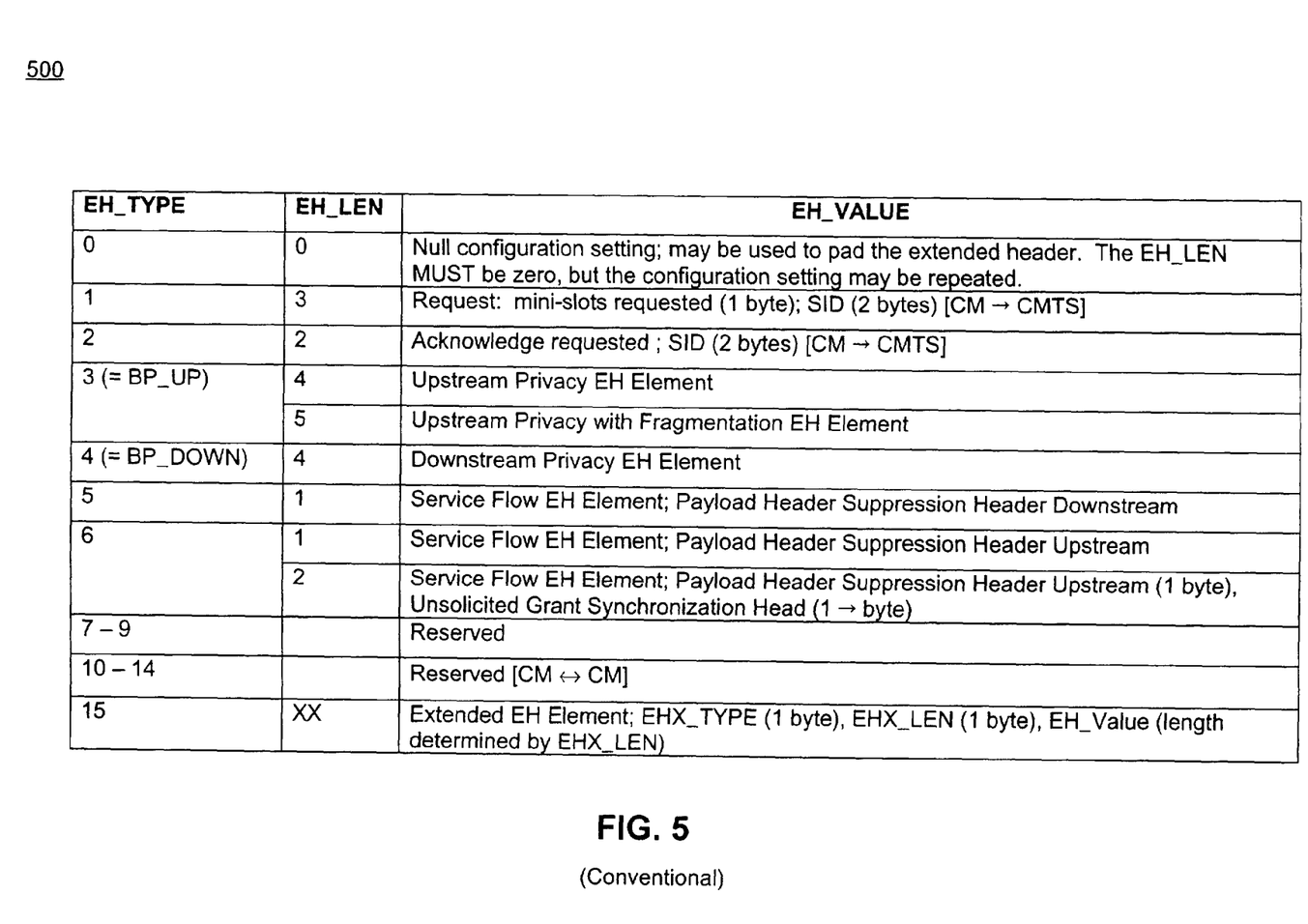
FIG. 5 is an illustration of conventional DOCSIS extender header types.

FIG. 5 is a more detailed an illustration 500 of the conventional EHDR format 406 shown in FIG. 4. In FIG. 5, the first ten EHDR element types (0-9) are intended for one-way transfer between a cable modem and an SMTS, such as the SMTS 204. Of particular note, the EHDR types 7-9 are reserved and configureable for other purposes, as will be discussed in greater detail below. The EHDR element types 10-15 are for end-to-end usage within a MAC-sublayer domain. The information attached to EHDR elements 10-14, on the upstream, is attached when the information is forwarded within a MAC-sublayer domain. The element type 15 provides for an escape mechanism that allows for more types and longer values.

Figure 6:
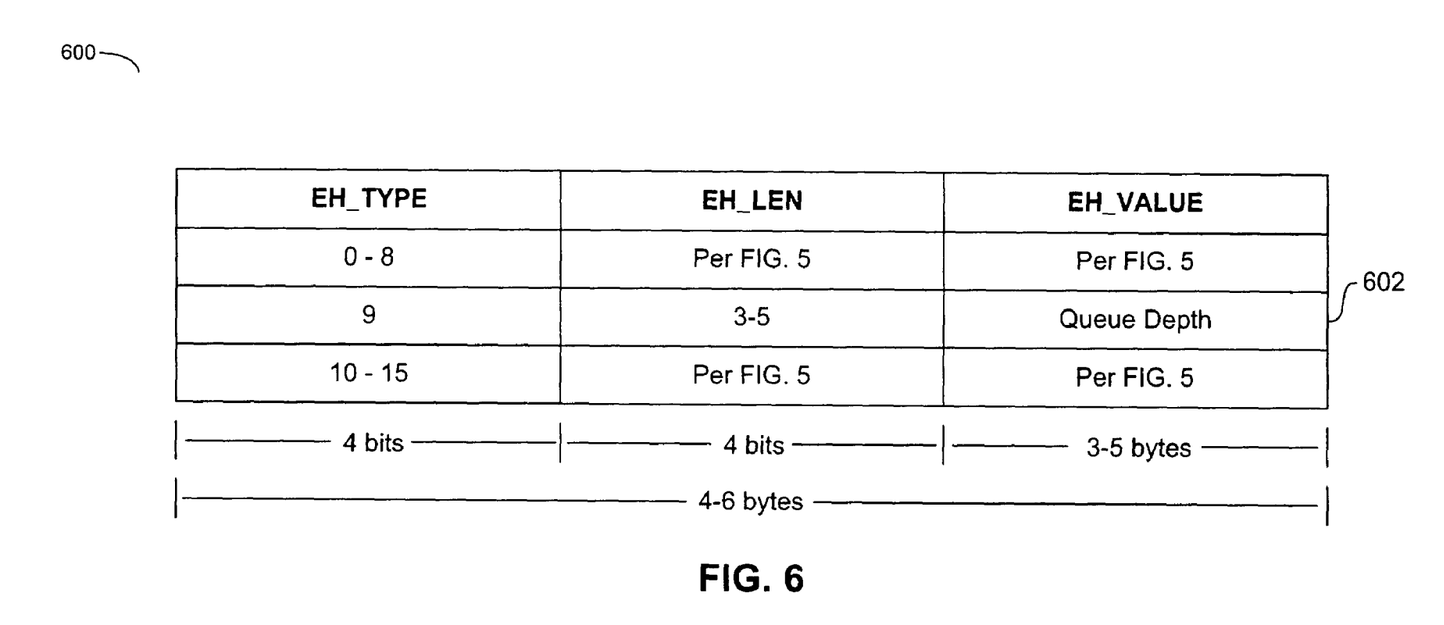
FIG. 6 is an illustration of an exemplary extended header structured and arranged in accordance with the present invention.

FIG. 6 illustrates the format of an EHDR format 600 structured and arranged in accordance with an embodiment of the present invention. In the EHDR format 600, the reserved EH_TYPE field 9, shown in the conventional EHDR format 500 of FIG. 5, is specifically modified to include a queue depth extended header field 602. The queue depth extended header field 602 will be used to signal the gateway 104 of the total amount of data (in bytes) waiting for transmission from the satellite modem 206 to the gateway 104.

In the exemplary EHDR format 600 of FIG. 6, the EH_TYPE and the EH_LEN fields are each 4 bit data fields. The 4 bits of the EH_TYPE field, as noted above, are used to indicate that the field value is "9," derived from the format 500 of FIG. 5. The 4 bit EH_LEN field is used to determine whether the entire EH_VALUE field, which follows the EH_LEN field, will be 3, 4 or 5 bytes in length. The combined overall length of the EH_TYPE, the EH_LEN, and EH_VALUE field typically ranges, in size, from 4-6 bytes.

Next, the queue depth EH_VALUE field 602 is a variable size field of 3, 4, or 5 bytes in length. The first 2 bytes describe the service identifier (SID), which represents either an upstream or a downstream uniquely identifiable flow of data. The final 1-3 bytes of the EH_VALUE field designate the actual queue depth. The queue depth is the total amount of data waiting to be transmitted in a particular service flow. These fields are used to permit the satellite modem 206 to request sufficient upstream channel bandwidth from the gateway 104. This additional bandwidth is a resource resident within, and controlled by, the gateway 104. The gateway 104 carefully controls the allocation of its bandwidth so that it can efficiently accommodate the use of the upstream channel by the satellite modems 206 and any other interconnected resources.

The additional bandwidth requested by the satellite modem 206, is required to accommodate the transmission of data waiting (queue depth) within a queue of the satellite modem 206. The queue depth, however, does not include physical layer overhead data. The actual designation of the queue depth value can be accomplished statically or dynamically, depending on a user's assessment of which approach more efficiently manages the resources of the satellite modem 206.

A user, at a predetermined time, can statically determine that the maximum number of IP, or Ethernet, packets requiring transmission from the satellite modem 206 to the gateway 104. If, byway of example, 200 packets are in the queue, the satellite modem 206 must request sufficient bandwidth from the gateway 104 to accommodate the transmission of 200 packets. Since the number "200" can be arithmetically represented using 8 bits or less ($2^\wedge$, $2^\wedge1$, $2^\wedge3$, ... $2^\wedge7$), the user can set the maximum queue depth to 1 byte, thereby conserving other system resources. At some other time, when larger numbers of users are added, the queue depth can be statically adjusted by the user, to 2 or 3 bytes, in order to accommodate transmission of a correspondingly greater number of packets.

On the other hand, the queue depth can be dynamically configured. That is, the satellite modem 206 can dynamically request additional bandwidth based on the amount of data in its queue at any given point in time. This latter approach is more sensitive to existing system traffic requirements and conditions, and automatically adjusts the queue depth field 602 accordingly. If, for example, the communication system 100 becomes congested, requiring additional bandwidth for transmission of about 15,000 packets, the modem 206 can change the queue depth 602 from 1 byte to 2 bytes, etc. This process ultimately enables the satellite modem 206 to request as much as 16.7 Mbytes of upstream channel bandwidth. In this manner, the limitations of the conventional DOCSIS based system are eliminated.

Figure 7:
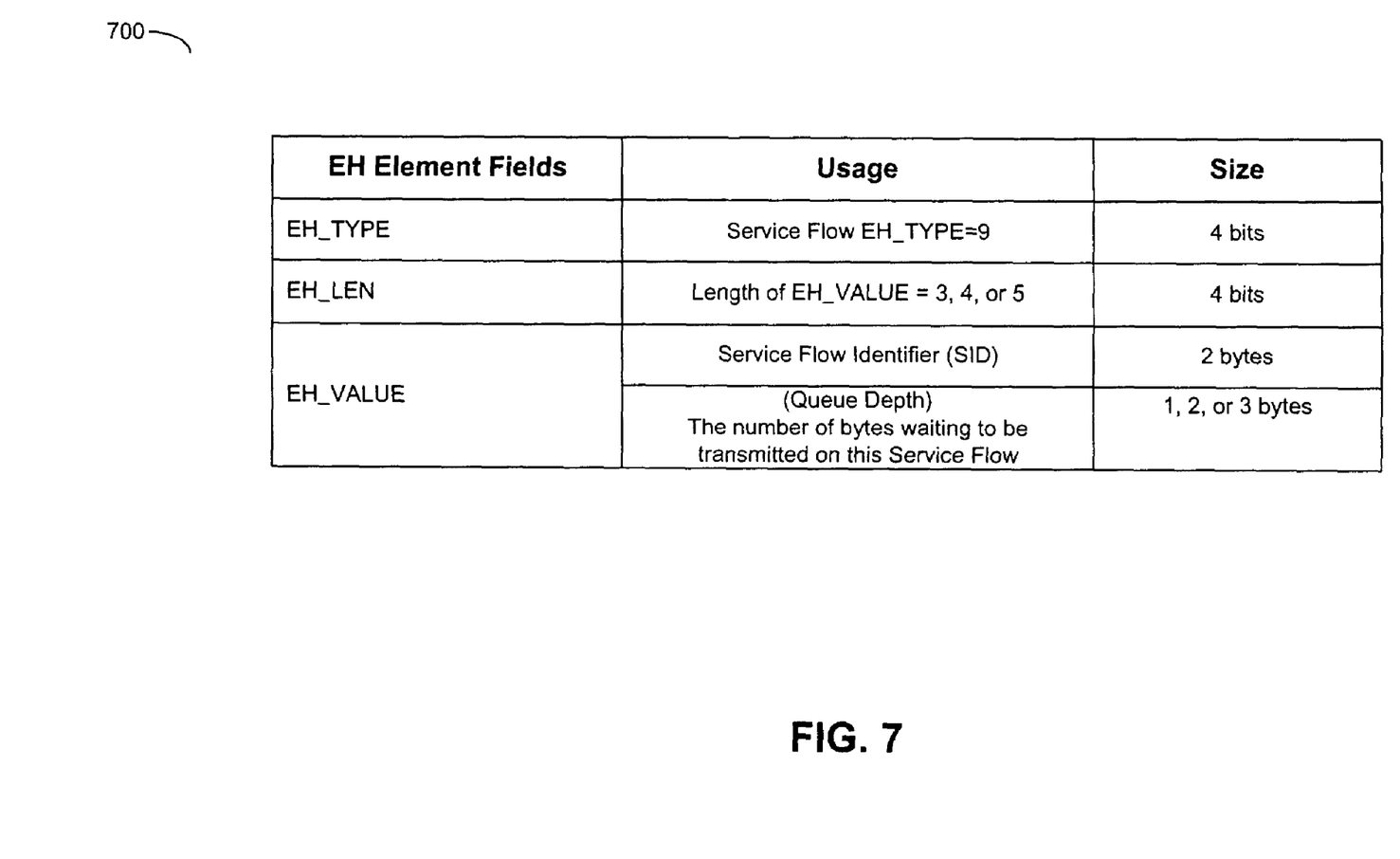
FIG. 7 depicts specific header formats for the extended header shown in FIG. 6.

FIG. 7 illustrates a more detailed realization 700 of the structure of the queue depth extended header 600, in accordance with the present invention. More specifically, FIG. 7 depicts the usage and size of the EH_TYPE, the EH_LEN, and EH_VALUE fields of the extended header format 600, shown in FIG. 6. An exemplary communications sequence will now be provided below in conjunction with a description of FIG. 8.

Figure 8:
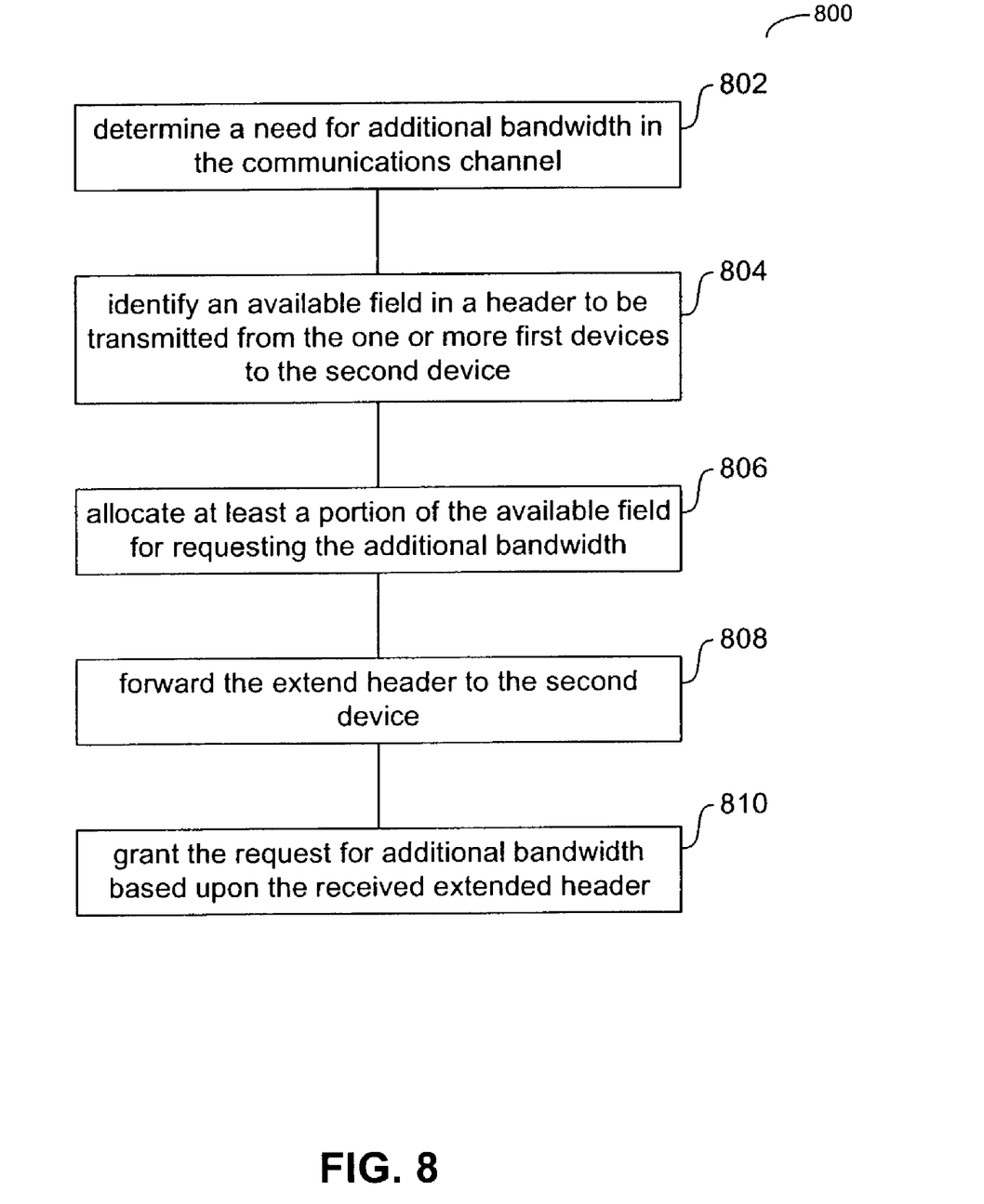
FIG. 8 is a flow chart of a exemplary method of practicing the present invention.

FIG. 8 is a flowchart depicting an exemplary method 800 of a satellite modem 206 requesting additional bandwidth from the gateway 104. When the satellite modem 206 comes on line within the communications system 200, it will desirably register with the gateway 104 to indicate that it is ready to enable a data transfer between the CPE 208 and the gateway 104. This registration process is initiated by the modem 206 first scanning in a downstream direction. The registration process, the modem 206 scans downstream to ensure that it's properly locked into an available downstream communications channel with the CPE 208 and other downstream modules. After scanning downstream, the modem 206 then scans upstream to assess the availability of an upstream channel with the gateway 104. If an upstream channel is available, the modem 206 will then synchronize with the gateway 104 in order to ultimately ensure synchronization between both the upstream and downstream channels.

Next, as indicated in block 802 of FIG. 8, the modem 206 determines a need for additional bandwidth in the upstream channel by examining the amount of data in its queue. When a need has been determined, the modem will designate the queue depth header field 602 as a mechanism to request the extra bandwidth from the gateway 104, as indicated in blocks 804 and 806. The extended header 602, using the format 600 is then transmitted to the gateway 104 to request the bandwidth, as shown in block 808. Finally, as indicated in block 810, the gateway 104 will desirably grant the additional bandwidth request in response to the request.

The gateway 104 can respond to a received queue depth extended header request in a variety of ways. The most straightforward response is directly granting the request, if there is bandwidth available on the upstream channel. Bandwidth requests are typically granted in the form of the gateway 104 allocating an appropriate number of mini-slots in the upstream channel for use by the modem 206. Additionally, the bandwidth grants are made with the gateway 104's knowledge of the fragmentation/concatenation capabilities of the satellite modem 206, and knowledge of assumptions about the packet sizes to be transmitted. The fragmentation/concatenation capabilities of the modem 206 are typically passed to the gateway 104 during the registration process.

If the bandwidth request is directly granted by the gateway 104, another handshake process is initiated. In this other handshake request, the gateway 104 will send a message map to the satellite modem 206, or to any other associated subscribers, indicating the precise number of mini-slots that have been granted to each subscriber.

In the alternative, unsolicited grant service (UGS) service flows can be established for the satellite modem 206. The queue depth EHDR information is used as an indication to either increase or decrease the rate of unsolicited grants to a given subscriber. In essence, each system subscriber would always be given an additional number of mini-slots during specifically predetermined time periods, independent of any particular bandwidth request. This alternative mechanism has the advantage of maintaining at least a minimal flow of grants to a subscriber while maintaining a controlled upstream data rate. This approach also has quality of service advantages.

Thus, using the modified header technique of the present invention, satellite modems, and similar devices, can more effectively request additional bandwidth from gateways or other devices when the modems have additional data in their queue requiring transmission. This technique can be implemented statically or dynamically, to more efficiently utilize available bandwidth and other vital system resources.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application specific integrated circuits, firmware, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method for requesting additional bandwidth in a communications channel between one or more first satellite terminal devices and a second satellite terminal device, the method comprising:

identifying an available field in an extended header to be transmitted from the one or more first devices to the second device, wherein the available field is bounded by a reconfigurable byte length within which an associated field value is stored;

allocating at least a portion of the available field in the extended header for requesting the additional bandwidth as-represented by the field value; and forwarding the extended header to the second device, wherein a length of the portion is a function of a reserved field within the extended header.

2. The method of claim 1, wherein communication between the first device and the second device is based upon a Data Over Cable Service Interface Specification (DOCSIS) media access control protocol.

3. The method of claim 2, wherein the first device is a satellite modem; and
wherein the second device is one of a satellite gateway and a satellite modem termination system.

4. The method of claim 3, wherein the communications channel is an upstream channel.

5. The method of claim 4, wherein the available field includes two or more reserved fields in the extended header;
wherein the extended header is a media access control (MAC) extended header.

6. The method of claim 5, wherein the MAC extended header specifies a type, length, and queue depth value fields within the one or more reserved fields.

7. The method of claim 6, wherein the allocated portion is configured for specifying a queue depth, the queue depth being associated with data in a storage queue of the satellite modem.

8. The method of claim 7, wherein a queue depth header field length is at least one byte.

9. The method of claim 7, wherein a queue depth header field length is one to three bytes.

10. The method of claim 8, wherein the available portion is configured for dynamic allocation.

11. The method of claim 2, further comprising determining a need for additional bandwidth in the communications channel.

12. The method of claim 11, further comprising granting the request for additional bandwidth based upon the received extended header, the granting including assigning bandwidth to each of the one or more first devices.

13. The method of claim 12, wherein the granting is based upon at least one of fragmentation and concatenation capabilities associated with each of the one or more first devices.

14. An apparatus for requesting additional bandwidth in a communications channel between one or more first satellite terminal devices and a second satellite terminal device, the apparatus comprising:

a module operable to identify an available field in an extended header to be transmitted from the one or more first devices to the second device, wherein the available field is bounded by a reconfigurable byte length within which an associated field value is stored;

a module operable to allocate at least a portion of the available field in the extended header for requesting the additional bandwidth as represented by the field value; and a module operable to forward the extended header to the second device,
wherein a length of the portion is a function of a reserved field within the extended header.

15. The apparatus of claim 14, wherein communication between the first device and the second device is based upon the Data Over Cable Service Interface Specification (DOCSIS) media access control protocol.

16. The apparatus of claim 15, wherein the first device is a satellite modem; and
wherein the second device is a satellite gateway.

17. The apparatus of claim 16, wherein the communications channel is an upstream channel.

18. The apparatus of claim 17, wherein the available field includes one or more reserved fields in the extended header; and
wherein the extended header is a media access control (MAC) extended header.

19. The apparatus of claim 18, wherein the MAC extended header specifies a type, length, and queue depth value fields within the one or more reserved fields.

20. The apparatus of claim 19, wherein the allocated portion is configured for specifying a queue depth, the queue depth being associated with data in a storage queue of the satellite modem.

21. The apparatus of claim 20, wherein a queue depth header field length is at least one byte.

22. The apparatus of claim 21, wherein a queue depth header field length is one to three bytes.

23. The apparatus of claim 22, wherein the available portion is configured for dynamic allocation.

24. The apparatus of claim 15, further comprising a module operable to determine a need for additional bandwidth in the communications channel.

25. The apparatus of claim 24, further comprising a module operable to grant the request for additional bandwidth based upon the received extended header, the granting including assigning bandwidth to each of the one or more first devices.

26. The apparatus of claim 25, wherein the granting is based upon at least one of fragmentation and concatenation capabilities associated with each of the one or more first devices.

* * * * *